United States Patent
Segura et al.

(10) Patent No.: US 10,359,538 B2
(45) Date of Patent: *Jul. 23, 2019

(54) DOWNHOLE TOOL MEASUREMENT DEVICE MOUNTING SYSTEM AND METHOD

(71) Applicant: Bench Tree Group, LLC, Georgetown, TX (US)

(72) Inventors: Pedro R. Segura, Round Rock, TX (US); Rene M. Rey, Georgetown, TX (US)

(73) Assignee: Bench Tree Group, LLC, Georgetown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,322

(22) Filed: Jul. 13, 2017

(65) Prior Publication Data

US 2017/0307777 A1  Oct. 26, 2017

Related U.S. Application Data

(63) Continuation of application No. 15/334,145, filed on Oct. 25, 2016, now Pat. No. 9,733,390, which is a continuation of application No. 13/098,326, filed on Apr. 29, 2011, now abandoned.

(60) Provisional application No. 61/330,187, filed on Apr. 30, 2010.

(51) Int. Cl.
*G01V 11/00* (2006.01)
*E21B 47/01* (2012.01)
*G01V 1/52* (2006.01)
*E21B 47/024* (2006.01)

(52) U.S. Cl.
CPC ............ *G01V 11/005* (2013.01); *E21B 47/01* (2013.01); *G01V 1/52* (2013.01); *E21B 47/024* (2013.01); *G01V 2001/526* (2013.01)

(58) Field of Classification Search
CPC .. G01V 1/52; G01V 11/005; G01V 2001/526; E21B 47/01; E21B 47/024
See application file for complete search history.

(56) References Cited

U.S. PATENT DOCUMENTS

| 4,542,647 A | * | 9/1985 | Molnar | E21B 47/022 175/45 |
| 6,351,891 B1 | * | 3/2002 | MacGugan | E21B 47/024 33/304 |
| 9,733,390 B2 | * | 8/2017 | Segura | G01V 11/005 |
| 2008/0201969 A1 | * | 8/2008 | Davies | E21B 47/022 33/365 |
| 2010/0018701 A1 | * | 1/2010 | Peter | E21B 44/00 166/250.01 |

* cited by examiner

*Primary Examiner* — David Z Huang
(74) *Attorney, Agent, or Firm* — Dunlap Codding, P.C.

(57) ABSTRACT

A downhole tool measurement device mounting system includes a chassis with a body and a chassis axis extending through the body. A monolithic assembly is mounted on the body of the chassis. The monolithic assembly includes a sensor mounted in a block. The monolithic assembly is mounted on the body of the chassis parallel to the chassis axis such that a sensing axis of the sensor is offset from a center of the body of the chassis.

14 Claims, 2 Drawing Sheets

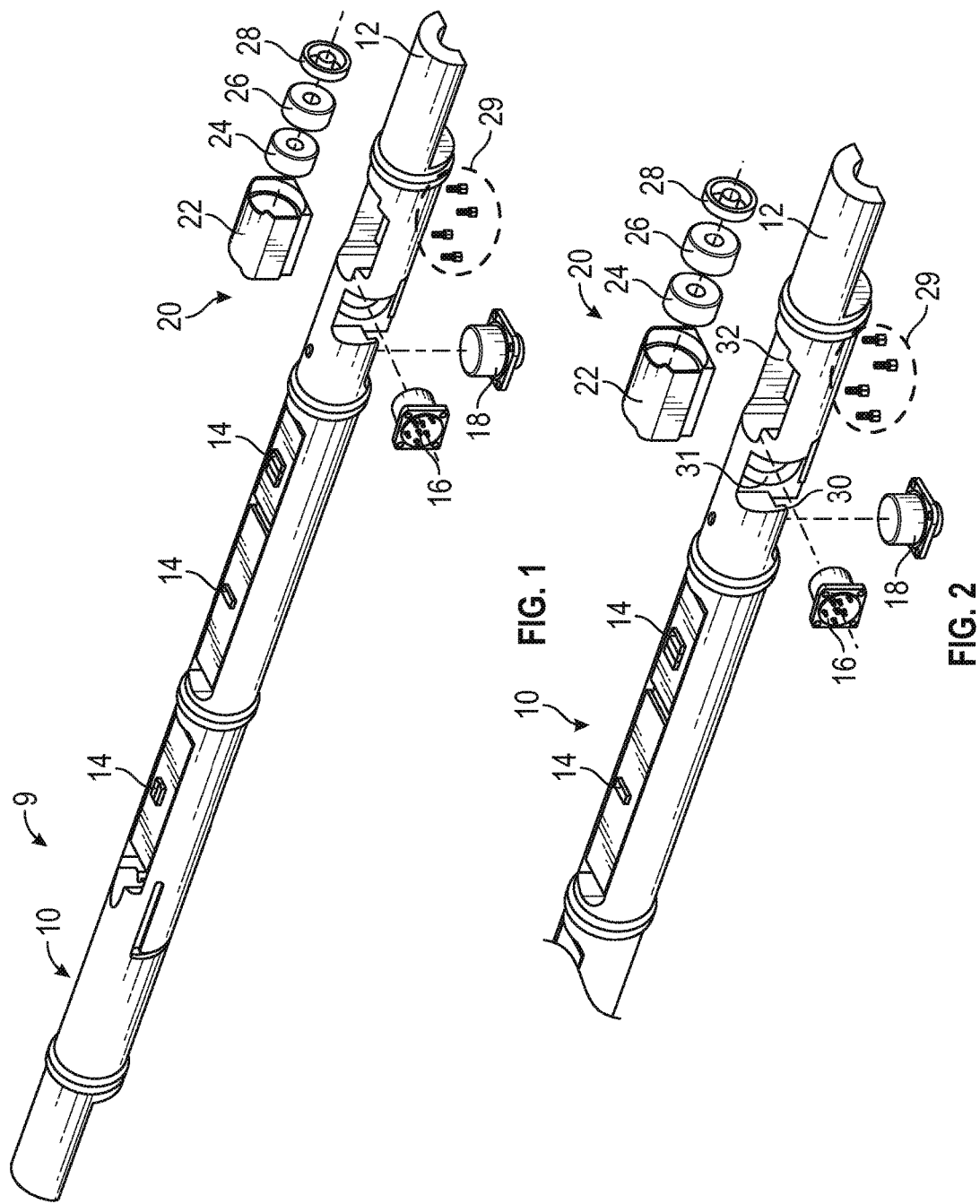

DOWNHOLE TOOL MEASUREMENT DEVICE MOUNTING SYSTEM AND METHOD

INCORPORATION BY REFERENCE

The present application claims priority to U.S. Provisional Patent Application Ser. No. 61/330,187, filed on Apr. 30, 2010, the non-provisional application identified by U.S. Ser. No. 13/098,326, filed Apr. 29, 2011, and the non-provisional application identified by U.S. Ser. No. 15/334,145, filed Oct. 24, 2016, the entire content of all are hereby incorporated herein for all purposes.

FIELD OF THE DISCLOSURE

The disclosure relates generally to downhole tools and in particular to downhole survey sensors.

BACKGROUND

A downhole survey instrument typically consists of electronics and various sensors packaged within a chassis usually machined from a cylindrical piece of non-magnetic material. The downhole survey instrument is usually a long, slender, assembly, due to the form factor of drilling sensor apparatus in which it is used. These typical instruments also have features that retain and ruggedize the sensors and electronics due to the harsh downhole environment. The survey assemblies typically include an inclinometer which sometimes consists of three or more, typically orthogonally positioned, accelerometers. An accelerometer pair is usually mounted normal to the elongated chassis axis, and a third accelerometer, usually called the Z axis accelerometer, is typically coaxial to the instrument chassis long axis.

In most typical systems, the 'Z' axis accelerometer for a downhole survey sensor is installed at one end of the elongated chassis since the cross-section of the accelerometer consumes a large percentage of the available chassis cross section. Furthermore, the chassis material cross-section must provide the structural integrity needed to maintain the relative positions of the sensors in the assembly through handling and use in the harsh downhole environment.

The typical configuration consists of installing an accelerometer into a coaxial pocket machined into one end of the instrument chassis and then retaining it with a threaded member or members that clamp the accelerometer in place. The disadvantage of this scheme is that it 1) limits placement of the 'Z' axis accelerometer near one end of the assembly; 2) If the 'Z' axis accelerometer is not located at the end of the chassis, additional members may need to be attached which complicates the sensor; 3) it makes routing of conductors difficult as not much cross-section remains for thru-wireways in the chassis; and 4) it takes more time to replace accelerometer due to the complexity of the assembly so that, for example, end components would need to be removed/un-wired to access the accelerometer.

Another configuration simply uses an elastomeric compound to 'glue' the accelerometer in place. This has the disadvantage of poor stability (since the accelerometer may be able to move) and difficult replacement/rework since the "glue" must be removed.

Thus, it is desirable to provide a mount for downhole survey sensor that overcomes the limitations and drawbacks of typical systems and it is to this end that the disclosure is directed.

BRIEF DESCRIPTION OF THE DRAWINGS

FIG. 1 illustrates an example of an implementation of a mounting for a survey sensor;

FIG. 2 illustrates more details of the distal end of the mounting for a survey sensor;

DETAILED DESCRIPTION OF ONE OR MORE EMBODIMENTS

Figure 3:
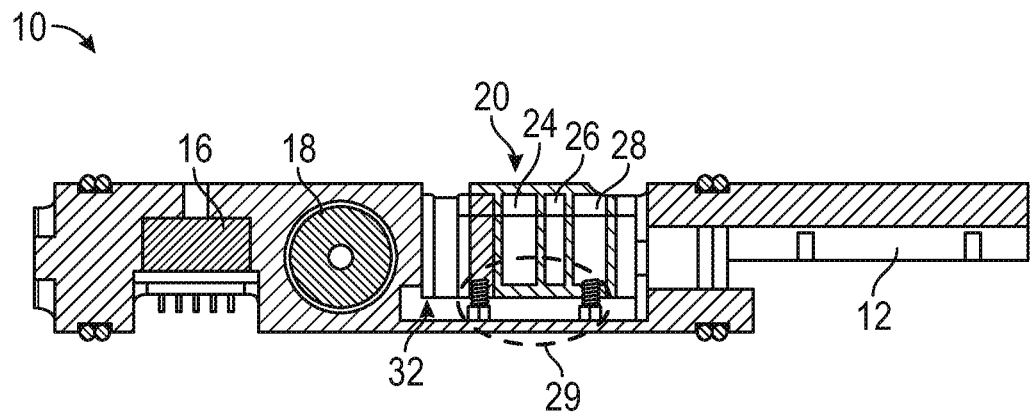
FIG. 3 is a sectional side view of the mounting for a survey sensor.

The disclosure is particularly applicable to a downhole survey sensor with accelerometers and it is in this context that the disclosure will be described. It will be appreciated, however, that the mounting system and method has greater utility since it can be used to mount other types of sensors and may be used for a variety of different industries in addition to the drilling/boring examples described below.

In one implementation, an accelerometer may be mounted, but the mounting device and mounting method may be used for other sensors and the mounting of other sensors is within the scope of this disclosure. In one implementation, an accelerometer subassembly may be mounted into/onto features machined on/in a chassis body 12 as shown in FIGS. 1 and 2. However, using the mounting device and method, the accelerometer assembly may be installed along axes (the x axis and/or the y axis) other than the typical z axis. In general terms, the accelerometer may be mounted into a 'block' that contains features for rigidly attaching the accelerometer. For example, the "block" may be a configuration in which a flange of the accelerometer is captured between a shoulder within the block and the shoulder of a threaded member or intermediate member that is captured by a threaded member. The block may be fastened to the chassis, such that the accelerometer has its sensing axis parallel to the chassis axis. The block and chassis may both have machined features, in this case shoulders/ledges, that, when the sensor is fully assembled, ensures a stable relative position between them and hence between other sensors and the Z accelerometer.

FIG. 1 illustrates an example of an implementation of a mounting 10 for a survey sensor which is also shown in more detail in FIG. 2. As shown in FIGS. 1 and 2, an implementation of the mounting 10 may include the chassis 12 into which a sensor, such as an accelerometer, may be mounted. The chassis 12 of the sensor body may have one or more circuits or printed circuit boards 14 attached to the chassis body as shown adjacent to the sensors. In one example, the circuits/printed circuit boards 14 may be mounted on a side of the chassis that is the same side on which at least one of the sensors are installed. As shown in FIG. 1, a tool 9 into which the mount 10 is connected/attached/affixed/part of may be significantly larger than the mount and the mount 10 may be used with various different types of tools. In the example in FIGS. 1 and 2, the chassis 12 may house a first sensor 16 and a second sensor 18, such as an X axis accelerometer and a Y axis accelerometer when the two accelerometers are mounted on different sides of the chassis 10 as shown. As shown in FIG. 2, each of the sensors 16, 18 may be mounted and secured into a cavity 30, 31 in the chassis. The mount may be used for various downhole sensors. For example, as described below in more detail, the sensor may be a magnetometer or gyroscope.

In the example in FIGS. 1 and 2, the chassis 12 also may house a third sensor assembly 20, such as a Z axis accelerometer assembly, that mounts in and is secured in a third cavity 32 in the chassis 12. The third accelerometer assembly 20 may further comprise a block 22 into which an accelerometer 24 is mounted. The third accelerometer assembly 20 may further comprise a retaining cap 26 that sits on top of the accelerometer 24 inside of the block 22. The third accelerometer assembly 20 may further comprise a retainer member 28, that may be threaded or may use another mechanism to secure the accelerometer in the block that releasably secures the accelerometer 24 and the retaining cap 26 into the block 22 to create a monolithic accelerometer assembly. Alternatively, the block 22 may be a configuration in which a flange of the accelerometer 24 is captured between a shoulder within the block (not shown) and a shoulder of a retainer member 28 of the retainer cap 26 that is captured by the retainer member 28. The monolithic accelerometer assembly may then be inserted into the cavity 32 and secured or fastened into the cavity so that, for example, the accelerometer 24 has its sensing axis parallel to the chassis axis. The monolithic accelerometer assembly may be secured to/fastened to the cavity/chassis by various mechanisms. For example, the block 22 and chassis cavity 32 may both have machined features, such as shoulders/ledges 30 (one of which is shown in FIG. 4), that, when the sensor is fully assembled, ensures a stable relative position between them and hence between other sensors and the accelerometer 24. Alternatively, as shown in FIGS. 1 and 3, the mount may have one or more securing mechanisms 29, such as screws, that secure the block 22 to the chassis.

Figure 4:
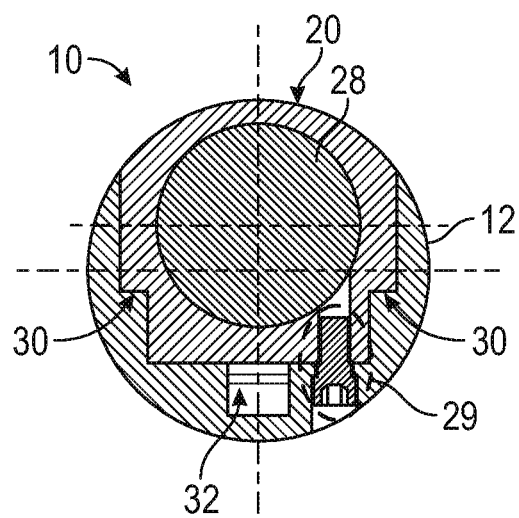
FIG. 4 is a sectional end view of the mounting for a survey sensor.

FIG. 3 is a sectional side view of the mounting 10 for a survey sensor. In this example, the sensors 16, 18, 20 are mounted on sides of the chassis 12 so that acceleration in the X axis, acceleration in the Y axis and acceleration in the Z axis can be measured. It is important to note that the third sensor assembly 20 does not need to be coaxial to the chassis 12 or the other sensors 16, 18. In particular, the ability to measure each different axis signal is based on the sensor axes being orthogonal and the configuration shown in FIGS. 1-4 satisfies this requirement while having the third sensor assembly 20 that is not coaxial to the chassis 12 or the other sensors 16, 18. The configuration shown in FIG. 1-4 is possible due to an offset that allows the mount to utilize a typically sized mini accelerometer. The configuration allows for the close grouping of the sensors (the inclinometer or accelerometers) if desired. In addition, the configuration enables and permits the placement of the third sensor at any location along the length of the survey sensor while maintaining a rugged, rigid, one-piece, chassis. For example, locating the sensors closer to the magnetometer and having a more rigid structure between them is important to survey accuracy and stability.

Returning to FIG. 3, the figure also shows the securing mechanisms 29 passing through the passing through the chassis 12 and securing the third sensor assembly 20 to the chassis 12. FIG. 4 is a sectional end view of the mounting 20 for a survey sensor in which the securing mechanisms 29 passing through the chassis 12 can be seen.

The mount, as shown in FIGS. 3 and 4, has a passageway 32 underneath the sensor assembly 20. The passageway may be used as a wireway for conductors that need to pass through this region of the assembly. Using this configuration, the sensor assembly 20 can be removed and re-installed without needing to remove these conductors.

In an alternative embodiment, the mount may mount a magnetometer sensor or a fluxgate magnetometer sensor. The magnetometer sensor or a fluxgate magnetometer sensor embodiment may also have an accelerometer or a group of accelerometers that are mounted on the downhole assembly. They magnetometer sensor or a fluxgate magnetometer sensor is an independent sensor commonly used in downhole assemblies. A magnetometer is a sensor system that measures a magnetic field. In a guidance system used in downhole assemblies, the common magnetic fields are from the earth's field or from other sources of magnetic fields such as interfering magnetic assemblies or adjacent wells with magnetic material in the well bores. Flux gate magnetometers are commonly used in downhole applications and all known downhole applications of flux gates use Permalloy material. Further details of magnetometers and flux gate magnetometers may be found in U.S. Pat. No. 6,972,563 which is incorporated herein by reference.

For a fluxgate magnetometer sensor, most modern fluxgate designs rely on a tape wound ring core approach which typically allows the combination of two orthogonal measurement axes on the same structure. The traditional material used is commonly known as Supermalloy, with a fairly high squareness BH loop index of some 0.75. Amorphous materials can offer improvements in squareness BH loop index to exceed 0.85 and much higher initial permeabilities, coupled with lower excitation current. All these qualities allow for a fluxgate structure which is smaller in size for equivalent sensitivity when compared with the traditional approach, plus lower drive current needs, which is highly beneficial since the typical measurement while drilling (MWD) string is battery operated. Amorphous material also exhibits lower magnetostriction effects, which produces better signal to noise ratios. The lower core losses verses temperature also allow the use of thicker ribbon, leading to a larger effective cross sectional area for a given OD/ID, which further improves the volumetric efficiency. An example of improved amorphous materials include Magnetic Metals DC annealed 9001.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A survey sensor, comprising:
a chassis formed of a single unit having a body, the body having a first end, a second end and a chassis axis extending from the first end to the second end;
a first sensor mounted to a first side of the body of the chassis, the first sensor being an X-axis sensor;
a second sensor mounted to a second side of the body of the chassis, the second sensor being a Y-axis sensor;
a third sensor assembly having a sensing axis, the third sensor assembly mounted within a third side of the body of the chassis spaced from the first end, and the second end, the third sensor assembly being mounted to form a passageway between the third sensor assembly, and the body, the third sensor assembly including a Z-axis sensor mounted in a block.

2. The survey sensor of claim 1, wherein wherein the third sensor assembly is mounted within the third side of the body such that the sensing axis of the Z-axis sensor is offset from a center of the body of the chassis.

3. The survey sensor of claim 2, wherein the passageway is formed between the block and the chassis, the passageway being sized and dimensioned to receive conductors.

4. The survey sensor of claim 1, wherein the third sensor assembly is mounted within the third side of the body such that a sensing axis of a Z-axis sensor is offset from the chassis axis.

5. The survey sensor of claim 1, wherein the third sensor assembly is monolithic.

6. The survey sensor of claim 1, wherein the third sensor assembly further comprises a retaining cap positioned adjacent to the Z-axis sensor.

7. The survey sensor of claim 6, wherein the third sensor assembly further comprises a retainer, the retainer securing the retaining cap, and the Z-axis sensor to the block.

8. The survey sensor of claim 1, wherein the Z-axis sensor includes a flange captured by the block and securing the Z-axis sensor to the block.

9. The survey sensor of claim 1, further comprising at least one circuit board mounted on the first side of the body of the chassis.

10. The survey sensor of claim 1, further comprising at least one circuit board mounted on the second side of the body of the chassis.

11. The survey sensor of claim 1, wherein the first sensor and the second sensor are mounted within the chassis.

12. The survey sensor of claim 1, wherein the first sensor measures at least one characteristic along a first axis and the second sensor measures the at least one characteristic along a second axis.

13. A survey sensor, comprising;
a chassis having a body with a first end and a second end, a chassis axis extending from the first end to the second end;
an X-axis sensor mounted on the body of the chassis, the X-axis sensor measuring at least one characteristic along a first axis;
a Y-axis sensor mounted on the body of the chassis measuring the at least one characteristic along a second axis;
a monolithic assembly mounted within the body of the chassis, the monolithic assembly having a Z-axis sensor mounted in a block and a retaining cap inside the block that secures the Z-axis sensor, the monolithic assembly mounted parallel to the chassis axis such that a sensing axis of the Z-axis sensor is offset from a center of the body of the chassis.

14. A survey sensor, comprising:
a chassis having a body with a first side, a second side, a third side, a first end, a second end opposite the first end, and a chassis axis extending from the first end to the second end;
a X-axis sensor mounted on the first side of the body of the chassis;
a Y-axis sensor mounted on the second side of the body of the chassis;
a monolithic assembly mounted on the third side of the body of the chassis, the monolithic assembly having a Z-axis sensor mounted in a block and a retaining cap inside the block that secures the Z-axis sensor, the monolithic assembly mounted within the body of the chassis such that a sensing axis of the Z-axis sensor is offset from a center of the body of the chassis.

* * * * *